(12) United States Patent
Mathew et al.

(10) Patent No.: US 7,982,749 B2
(45) Date of Patent: Jul. 19, 2011

(54) SERVER-BASED RASTERIZATION OF VECTOR GRAPHICS

(75) Inventors: Abraham Mathew, Edmonds, WA (US); William Guthrie Morein, Seattle, WA (US); Sung Won Shin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 12/023,171

(22) Filed: Jan. 31, 2008

(65) Prior Publication Data

US 2009/0195553 A1    Aug. 6, 2009

(51) Int. Cl.
G09G 5/00 (2006.01)
G09G 5/02 (2006.01)

(52) U.S. Cl. ........ 345/619; 345/603; 358/1.13; 358/524

(58) Field of Classification Search .................... 345/619
See application file for complete search history.

(56) References Cited

U.S. PATENT DOCUMENTS

| | | | | |
|---|---|---|---|---|
| 5,028,848 A * | 7/1991 | Bankston et al. | ............. | 315/364 |
| 5,113,486 A | 5/1992 | Luttmer | | |
| 5,164,711 A * | 11/1992 | Tuel, Jr. | ........................ | 345/602 |
| 5,487,139 A | 1/1996 | Saylor et al. | | |
| 5,754,304 A * | 5/1998 | Endo et al. | ..................... | 382/298 |
| 6,181,349 B1 * | 1/2001 | Bardon et al. | ................. | 345/419 |
| 6,266,455 B1 * | 7/2001 | Kobayashi | ..................... | 382/307 |
| 6,339,424 B1 * | 1/2002 | Ishikawa et al. | .............. | 345/419 |
| 6,929,411 B2 | 8/2005 | Christiansen et al. | | |
| 6,999,101 B1 | 2/2006 | Sanborn et al. | | |
| 7,242,406 B2 | 7/2007 | Robotham et al. | | |
| 7,295,885 B2 | 11/2007 | Okuyama | | |
| 7,810,025 B2 * | 10/2010 | Blair et al. | ..................... | 715/239 |
| 2002/0097417 A1 * | 7/2002 | Chang et al. | ................. | 358/1.13 |
| 2003/0098862 A1 * | 5/2003 | Hunt et al. | ..................... | 345/418 |
| 2004/0095589 A1 | 5/2004 | Arai | | |
| 2004/0227963 A1 * | 11/2004 | Jacobsen et al. | ............... | 358/1.9 |
| 2005/0065623 A1 | 3/2005 | Miyoshi et al. | | |
| 2006/0244751 A1 * | 11/2006 | Kitora | ........................... | 345/501 |
| 2007/0011457 A1 | 1/2007 | Dubinsky et al. | | |
| 2007/0211061 A1 | 9/2007 | Kokojima | | |
| 2008/0050045 A1 * | 2/2008 | Kitashou | ....................... | 382/298 |
| 2008/0273218 A1 * | 11/2008 | Kitora et al. | ................... | 358/1.13 |

OTHER PUBLICATIONS

"Converting vector images to raster images. (Converting WMF to JPEG. Converting WMF to raster images.)", 2007, fCoder Group, Inc., pp. 1.
"Batik SVG Toolkit", 2000-2008, The Apache Software Foundation, pp. 1-3.
"ABC Amber SVG Converter", 2003-2008, ProcessText Group, pp. 1-3.

* cited by examiner

*Primary Examiner* — M Good Johnson
(74) *Attorney, Agent, or Firm* — Hope Baldauff Hartman, LLC

(57) ABSTRACT

Technologies are described herein for high-performance rasterization of a vector graphic on a server computer. A vector graphic loader receives the vector graphic and generates an intermediate data structure from the vector graphic. A vector graphic renderer receives the intermediate data structure and renders the intermediate data structure to a render surface. An imaging component encodes the contents of the render surface to a raster image in a standard image format. The vector graphic loader and the vector graphic renderer are configured for multi-threaded and multi-processor execution on a server computer, which provides high performance.

6 Claims, 5 Drawing Sheets

US 7,982,749 B2

SERVER-BASED RASTERIZATION OF VECTOR GRAPHICS

BACKGROUND

There currently exist two distinct data types utilized to generate and represent images and other graphical objects on computing systems. These data types are typically referred to as "vector" and "raster" graphics. Raster graphics, also referred to as "bitmap" graphics, consist of a sequence of data representing a generally rectangular grid of picture elements, called "pixels." Raster graphics generally correspond pixel-for-pixel with a displayed or printed representation of the content. Because raster graphics are discrete, they generally do not scale well.

Vector graphics, on the other hand, are represented by description, rather than by listing a value for each pixel in a graphic. Any geometric shape can be represented as a vector graphic, and any arbitrary shape may be represented by a combination of such geometric shapes, and hence as a vector graphic. For instance, a straight-line segment may be described as a vector graphic by describing its two endpoints, or by its slope, length, and origin. Likewise, a circle could be described in vector representation by describing its radius and center point. Accordingly, vector graphics are sometimes referred to as "geometric" data, since they define objects by description rather than as a sequence of pixels. Because vector graphics are continuous, they tend to scale very well.

In order for a standard viewer application, like a World Wide Web ("web") browser to render a vector graphic, it is generally necessary to utilize a special plug-in to display the vector graphic. In many cases, a user may be unable to locate, download, and install a compatible plug-in for rendering vector graphics. In other cases, a compatible version of the plug-in may not be available for the type of device on which the user wishes to view the vector graphic. For instance, a user may wish to view a vector graphic on a personal digital assistant ("PDA") or a wireless mobile telephone for which a version of the plug-in does not exist.

Most devices and standard viewer applications can, however, display a raster graphic without the need for a plug-in or other additional software. As a result, vector graphics may be rasterized to raster graphics for display on the widest variety of devices without the use of a plug-in. For instance, a server computer may rasterize a vector graphic to a raster graphic for display by a web browser without the use of a plug-in.

Traditional methods for rasterizing a vector graphic are, however, generally unsuitable for use on a server computer. This is typically due to the fact that previous methods for converting a vector graphic to a raster graphic utilize software components that are not designed to execute on multiple threads and that incur performance penalties due to the use of global and process-level locks. Once example of such components are the Graphics Device Interface ("GDI") and GDI+ components that are frequently utilized to rasterize vector graphics on computing systems based upon the WINDOWS family of operating systems from MICROSOFT CORPORATION of Redmond, Wash.

It is with respect to these considerations and others that the disclosure made herein is presented.

SUMMARY

Technologies are described herein for high-performance rasterization of vector graphics on a server computer. In particular, through the utilization of the technologies and concepts presented herein, vector graphics can be rasterized without the use of software components that are not optimized for execution on multiple threads and that may utilize performance-reducing global and process-level locks, such as the GDI and GDI+ components. In this manner, vector graphics can be rasterized on a server computer in a highly performant and scalable fashion.

According to one aspect presented herein, a vector graphic is rasterized by first generating an intermediate data structure, such as a visual tree, graph, or stack, from the vector graphic. The intermediate data structure is a data structure utilized to represent the component shapes within the vector graphic. Once the intermediate data structure has been generated, it is rendered to a render surface. In one implementation, the render surface is an uncompressed, unencoded bitmap image. The render surface is then encoded to a raster image. The raster image may be in a standard image format, such as the JPEG or portable network graphics ("PNG") formats, which can be displayed by a standard viewer application program like a web browser without the use of a plug-in.

According to other aspects, a vector graphic loader is executed to generate the intermediate data structure from the vector graphic and a vector graphic renderer is executed to render the intermediate data structure to the render surface. The vector graphic loader and the vector graphic renderer are highly threaded programs that are configured for multi-threaded and multi-processor execution on a server computer, which provides high performance. In one implementation, the vector graphic is formatted using an extensible application markup language ("XAML"), such as SILVERLIGHT XAML from MICROSOFT CORPORATION. In this implementation, the vector graphic loader is a XAML loader configured to generate the intermediate data structure from a XAML vector graphic file and the vector graphic renderer is a XAML graphic renderer.

According to additional aspects, a published drawing generated by a drawing program is stored at a server computer. The published drawing includes a vector representation of the drawing. When a request is received to view the published drawing, such as from a web browser, the vector representation of the drawing is updated and then rasterized. In order to rasterize the vector representation of the drawing, an intermediate data structure is generated from the vector representation, the intermediate data structure is rendered to a render surface, and the render surface is encoded to a rasterized drawing in a standard image format. The rasterized drawing is returned in response to the request to view the published drawing.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
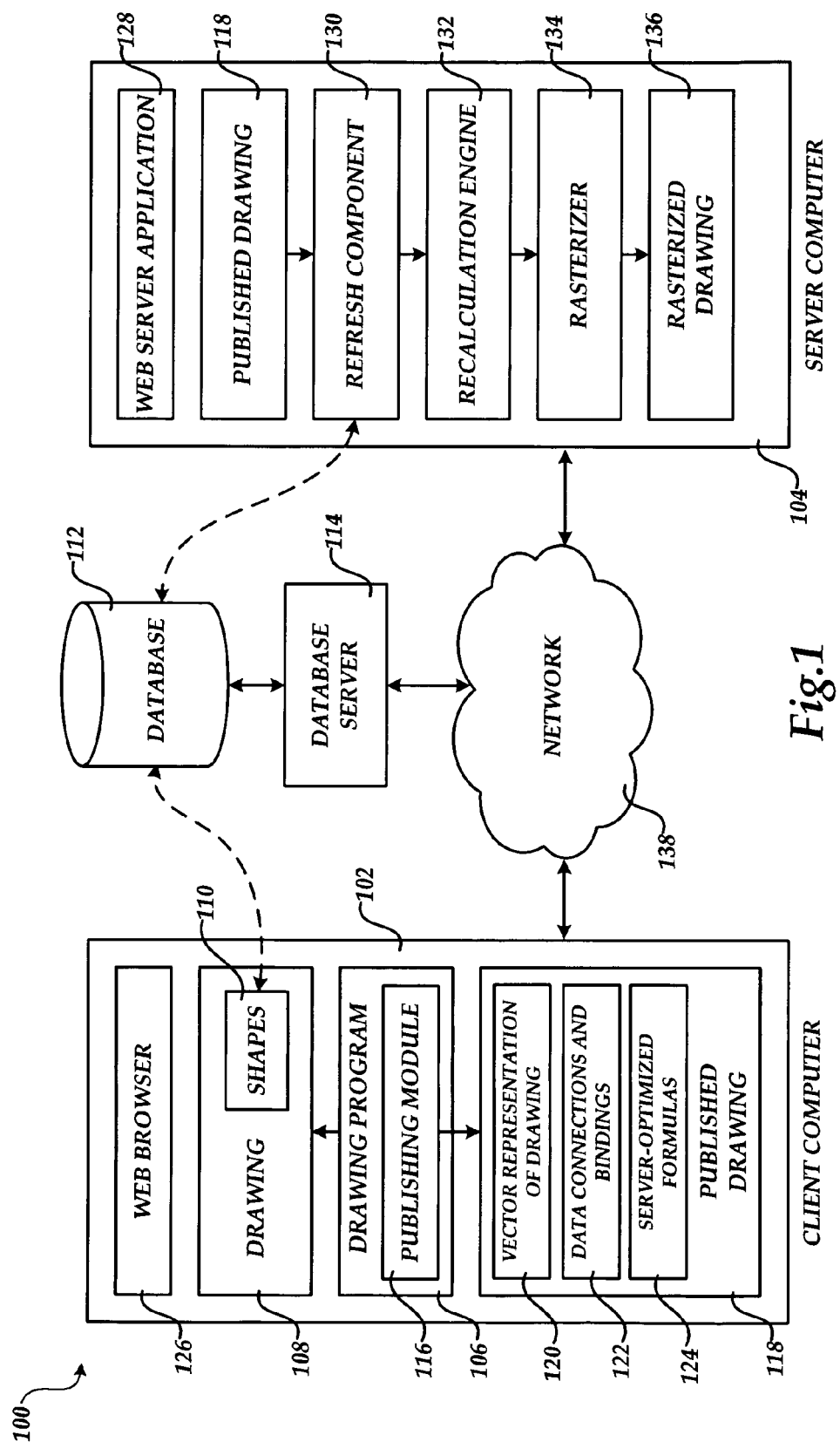
FIG. 1 is a combined network and software architecture diagram showing aspects of an illustrative operating environment and several software components provided by the embodiments presented herein.

The following detailed description is directed to technologies for rasterizing vector graphics on a server computer. Through the use of the technologies and concepts presented herein, a drawing can be created on a client computer, published to a server computer, and rasterized on the server computer for display using a standard viewer application program. The rasterization process described herein utilizes highly threaded and multi-processor components, thereby making the process scalable and highly performant when executed on an appropriately configured server computer.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for recalculating vector graphics on a server computer will be described.

Turning now to FIG. 1, details will be provided regarding an illustrative operating environment and several software components provided by the embodiments presented herein. In particular, FIG. 1 shows aspects of a system 100 that is capable of server-based rasterization of a vector graphic. The system 100 includes a client computer 102 and a server computer 104. The client computer 102 comprises a standard desktop, laptop, or handheld computing system capable of executing the drawing program 106 and a web browser 126.

The drawing program 106 comprises an executable application program capable of creating a drawing 108. One example of such a drawing program is the VISIO drawing program from MICROSOFT CORPORATION. The drawing 108 may include a multitude of visual elements laid out in virtually in any format. In particular, the drawing 108 may include one or more shapes 110. The shapes 110 may be bound to an external data source. For instance, various attributes of the shapes 110, such as the color, size, position, or orientation, may be linked to an external data source, such as the database 112 provided by the database server 114. In this manner, the visual appearance of the shapes 110 can be driven by the data retrieved from the database 112. The drawing program 106 may also provide functionality for binding the attributes of the shapes 110 to other types of data sources in addition to database 112. For instance, the attributes of the shapes 110 may be bound to a spreadsheet, a list, or another type of data source external to the drawing program 106.

The drawing program 106 may also provide functionality for allowing a user to specify a formula that references an external data source and indicates how the value of the external data should be utilized to modify the attributes of the shapes 110. For instance, a user may utilize the drawing program 106 to specify a formula that changes the color of one of the shapes 110 depending on the value retrieved from the database 112. Other formulas may be defined that specify how other types of attributes of the shapes 110 are to be modified based upon the retrieved external data. The formulas may include references to other formulas, data binding references to data values stored in an external data source, and functions.

In one embodiment presented herein, the drawing program 106 also provides functionality for publishing the drawing 108 to a server computer 104. In particular, a drawing 108 having one or more shapes 110 with attributes defined by a formula that references external data may be published to the server computer 104. In order to publish the drawing 108 to the server computer 104, the drawing program 106 utilizes a publishing module 116. In response to receiving a request to publish the drawing 108 to the server computer 104, such as from a user, the publishing module 106 is executed.

The publishing module 116 is configured to generate a published drawing 118 that is published to the server computer 104. In order to generate the published drawing 118, the publishing module 116 generates server-optimized formulas 124 for any formulas within the drawing 108 that reference external data. The server-optimized formulas 124 are compact formulas that are suitable for evaluation by the server computer 104.

The publishing module 116 also generates a vector graphic of the drawing 108, referred to herein as the vector representation 120 of the drawing 108. The vector representation 120 comprises a representation of the drawing 108 in a vector graphics format. In one implementation, the vector representation 120 is expressed utilizing the SILVERLIGHT extensible application markup language ("XAML") from MICROSOFT CORPORATION of Redmond, Wash. It should be appreciated, however, that other types of languages for describing vector graphics might also be utilized. For instance, the Scalable Vector Graphics ("SVG") format may be utilized in embodiments. As illustrated in FIG. 1, the published drawing 118 also includes data connections and bindings 122. The data connections and bindings 122 comprises data that identifies the connections or bindings between shapes 110 contained in the drawing 108 and external data sources, such as the database 112.

Once the publishing module 116 has generated the vector representation 120 of the drawing 108, the data connections and bindings 122, and the server-optimized formulas 124, these items are transmitted to the server computer 104 via a communications network, such as the network 138. The server computer 104 stores the published drawing 118 in an appropriate mass storage device.

According to other aspects presented herein, the server computer 104 may also receive and respond to requests from a client computer 102 to view the published drawing 118. Such a request may be received by a web server application 128 from a web browser 126 executing on the client computer 102. Although the web browser 126 has been illustrated in FIG. 1 as executing on the same client computer 102 as the drawing program 106, the web browser 126 may be utilized on another client computer or other type of computing device that does not have the drawing program 106 installed thereupon.

In response to receiving a request to view the published drawing 118, the server computer 104 executes a refresh component 130. The refresh component 130 is operative to utilize the data connections and bindings 122 to obtain updated values for externally referenced data. For instance, in the example shown in FIG. 1, the refresh component 130 communicates with the database 112 to update the values for attributes in the drawing 108 that reference the database 112.

Once updated values have been obtained, a recalculation engine 132 is executed that evaluates the server-optimized formulas 124 with the updated values for the shape attributes obtained by the refresh component 130. When the recalculation engine 132 has completed evaluating the server-optimized formulas 124 to obtain the updated values for the external data, the recalculation engine updates a portion of the vector representation 120 of the drawing 108 to reflect the updated values. For instance, attributes or other markup language elements contained within the vector representation 120 may be replaced or modified to specify the updated value for the attribute. It should be appreciated that refreshing the values of externally referenced data and evaluating server-optimized formulas 124 are completely optional operations. The embodiments presented herein may be utilized to rasterize a static vector representation of a drawing that does not utilize formulas or reference external data sources.

Once the recalculation engine 132 has updated the vector representation 120 of the drawing 108, a rasterizer 134 is executed to rasterize the vector representation 120 into a raster image, referred to herein as the rasterized drawing 136. In one implementation, the rasterized drawing 136 is stored in a standard image format, such as the portable network graphics ("PNG") image format, that may be displayed without the assistance of a plug-in module by a standard viewer application, such as the web browser 126. The rasterized drawing 136 is returned to the web browser 126 in response to the original request to view the published drawing 118 received at the server computer 104. Additional details regarding the operation of the rasterizer 134 for rasterizing the vector representation 120 of the drawing 108 into a raster image are provided below with respect to FIGS. 3-4.

Figure 2:
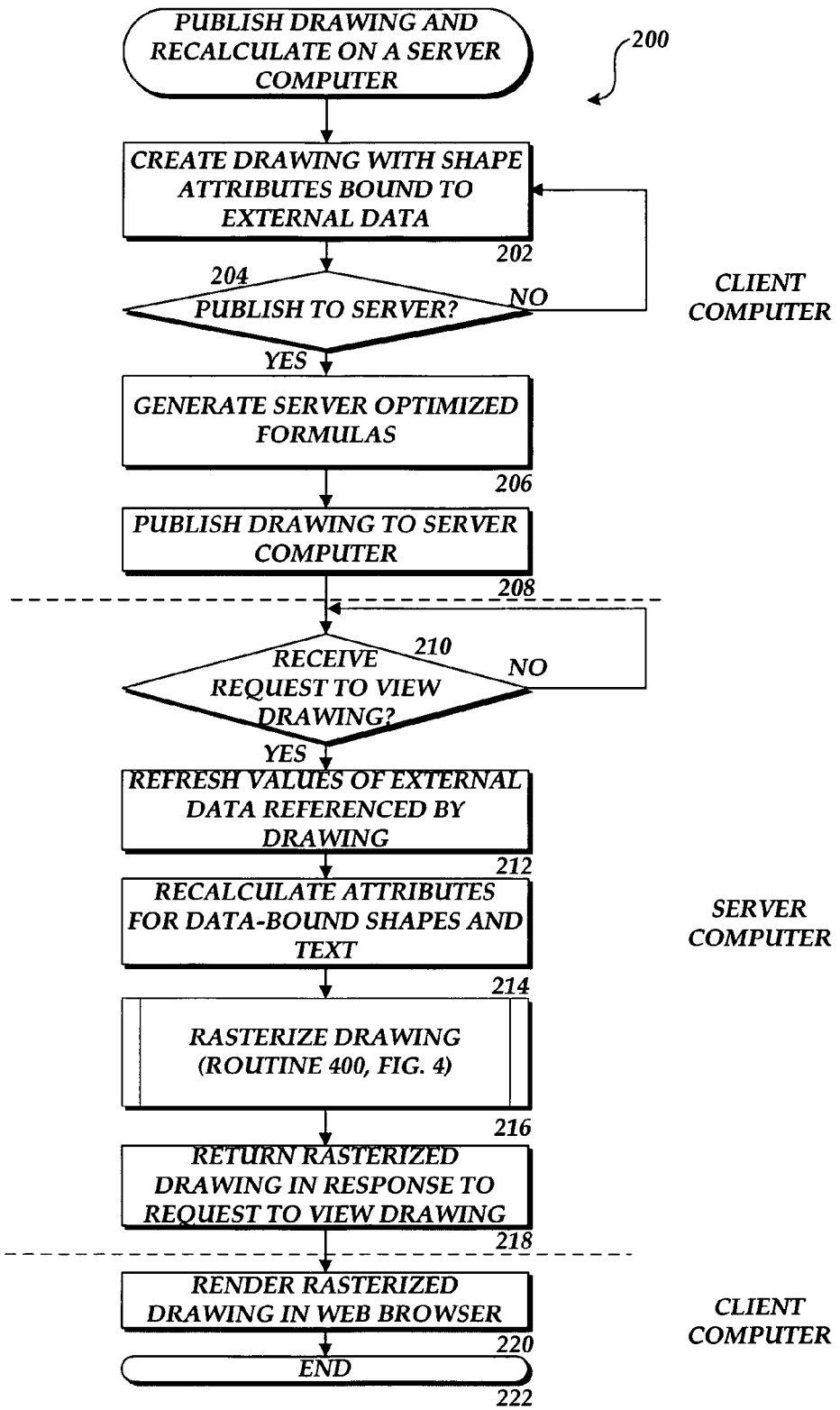
FIG. 2 is a flow diagram showing aspects of one embodiment provided herein for publishing a drawing to a server computer and rasterizing a vector representation of the drawing on the server computer.

Referring now to FIG. 2, additional details will be provided regarding the embodiments presented herein for rasterizing vector graphics on a server computer 104. In particular, FIG. 2 is a flow diagram showing a routine 200 that illustrates aspects of the operation of the client computer 102 for publishing a drawing 108 to the server computer 104, and aspects of the operation of the server computer 104 for recalculating and rasterizing the vector representation 120 of the drawing 108 in one embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the drawing program 106 is utilized to create a drawing 108 that includes shapes 110 that have attributes bound to external data or that includes attributes that are defined by a formula that references external data. From operation 202, the routine 200 continues to operation 204, where the drawing program 106 determines whether a request has been received to publish the drawing 108 to the server computer 104. In the absence of such a request, the routine 200 returns to operation 202, where the functionality for creating and editing the drawing 108 is continually provided. If a request is received to publish the drawing 108 to the server computer 104, the routine 200 continues to operation 206. At operation 206, the publishing module 116 identifies any formulas contained within the drawing 108 that reference external data. These formulas are then converted to the server-optimized formulas 124.

From operation 206, the routine 200 continues to operation 208 where the publishing module 116 publishes the published drawing 118 to the server computer 104. As discussed above, the published drawing 118 includes the vector representation 120 of the drawing 108, the data connections and bindings 122, and the server-optimized formulas 124. In one implementation, the drawing 108 may also be published to the server computer 104 in a native format along with the published drawing 118.

As discussed above, when the server computer 104 receives the published drawing 118, the published drawing 118 is stored in an appropriate mass storage device. The server computer 104 may then receive and respond to requests to view the published drawing 118, such as from the web browser 126. The web server application 128 receives and responds to such requests by executing the various software components described herein. If a new request is received to view the published drawing 108, the routine 200 continues from operation 210 to operation 212.

At operation 212, the refresh component 130 obtains updated values for the externally referenced data. For instance, the refresh component 130 may utilize the data connections and bindings 122 to obtain updated values from the database 112. Once the refresh data has been obtained, the routine 200 continues to operation 214. At operation 214, the recalculation engine 132 is executed and recalculates the values for any attributes within the drawing 108 that are connected to externally bound data. In particular, the recalculation engine 132 evaluates the server-optimized formulas 124 utilizing the updated data values obtained from the external data sources by the refresh component 130.

Once the attributes have been updated, the routine 200 continues from operation 214 to operation 216, where the rasterizer 134 rasterizes the published drawing 118 into a raster image, the rasterized drawing 136, which may be stored in a standard image format. Once the rasterized drawing 136 has been generated, the routine 200 continues to operation 218 where the rasterized drawing 136 is returned to the web browser 126 in response to the original request to view the published drawing 118. The web browser 126 receives the rasterized drawing 136 at operation 220 and displays the rasterized drawing 136. The routine 200 then continues from operation 220 to operation 222, where it ends. Additional details regarding the structure and operation of the rasterizer 134 are provided below with respect to FIGS. 3 and 4.

Figure 3:
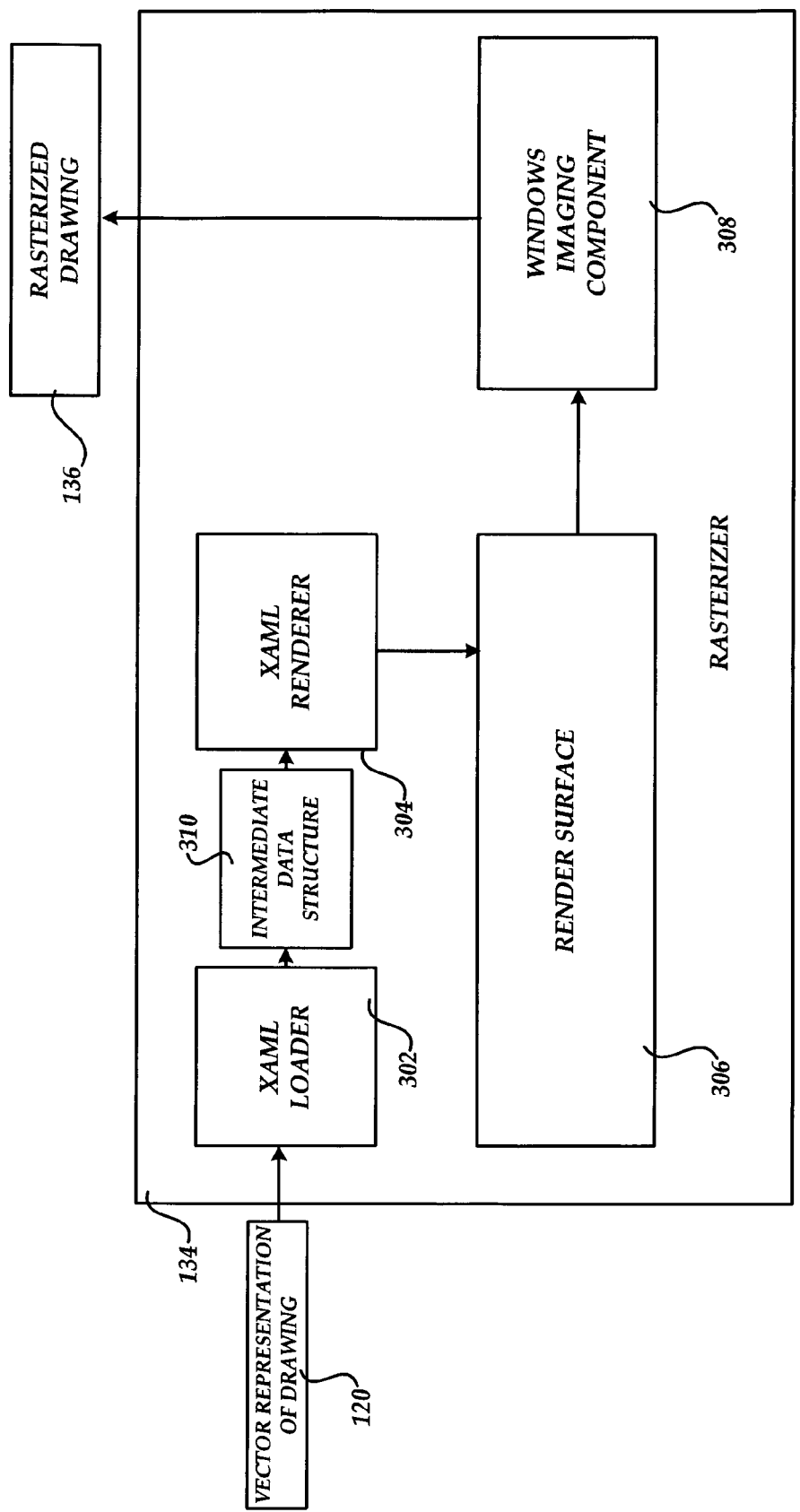
FIG. 3 is a software architecture diagram showing aspects of a rasterizer provided in various embodiments presented herein.

Referring now to FIG. 3, additional details regarding a software architecture utilized to implement the rasterizer 134 in one embodiment will be described. As shown in FIG. 3, the rasterizer 134 comprises a vector graphic loader, a vector graphic renderer, and a WINDOWS IMAGING COMPONENT 308. In embodiments where the vector graphic is formatted using XAML, the vector graphic loader is referred to as the XAML loader 302 and the vector graphic renderer is referred to as the XAML renderer 304. It should be appreciated, however, that these components may be utilized with vector graphics expressed using vector formats other than XAML.

The XAML loader 302 comprises a software component that is operative to receive the vector representation 120 of the drawing 108 in XAML, and to generate an intermediate data structure 310 from the vector representation 120. As discussed briefly above, the intermediate data structure 310 is a data structure that represents the component shapes within the vector graphic. In one implementation, the intermediate data structure 310 is a visual tree data structure that contains nodes for each shape or other drawing element in the drawing 108. The visual tree is an internal data structure utilized by the rasterizer 134 as an intermediate rendering of the vector representation 120. According to other embodiments, other types of data structures may be utilized for the intermediate data structure 310, such as a graph or a stack data structure.

Once the intermediate data structure 310 has been generated, the XAML renderer 304 renders the intermediate data structure 310 onto a render surface 306. In one implementation, the render surface 306 an uncompressed, unencoded bitmap image. Once the XAML renderer 304 has generated the render surface 306, the render surface 306 is transmitted to the WINDOWS IMAGING COMPONENT 308. The WINDOWS IMAGING COMPONENT 308 is a Component Object Model-based imaging encoder-decoder ("codec") for working with and processing digital images and image metadata. It also allows applications, such as the rasterizer 134, to obtain support of installed codecs for graphics file formats.

In the implementation illustrated in FIG. 3, the WINDOWS IMAGING COMPONENT 308 is utilized to encode the render surface 306 to a raster image, such as the rasterized drawing 136. It should be appreciated that the raster image may be in a standard image format, such as the JPEG or PNG formats, which can be displayed by a standard viewer application program like the web browser 126 without the use of a plug-in. An appropriate codec may be utilized by the WINDOWS IMAGING COMPONENT to encode the render surface 306 to the desired format. It should also be appreciated that while the WINDOWS IMAGING COMPONENT has been illustrated and described herein as encoding the render surface 306 to a raster image, other such components from other manufacturers may be utilized similarly.

According to embodiments presented herein, the XAML loader 302 and the XAML renderer 304 are configured for multi-threaded and multi-processor execution on a server computer. In order to enable this functionality, for instance, all memory allocated by these components may be managed by a memory manager that is optimized for symmetric multiprocessing. High scalability is obtained in this manner by allowing multiple threads to allocate memory. This provides a significant performance boost over previous rasterization systems that utilize GDI or GDI+.

Figure 4:
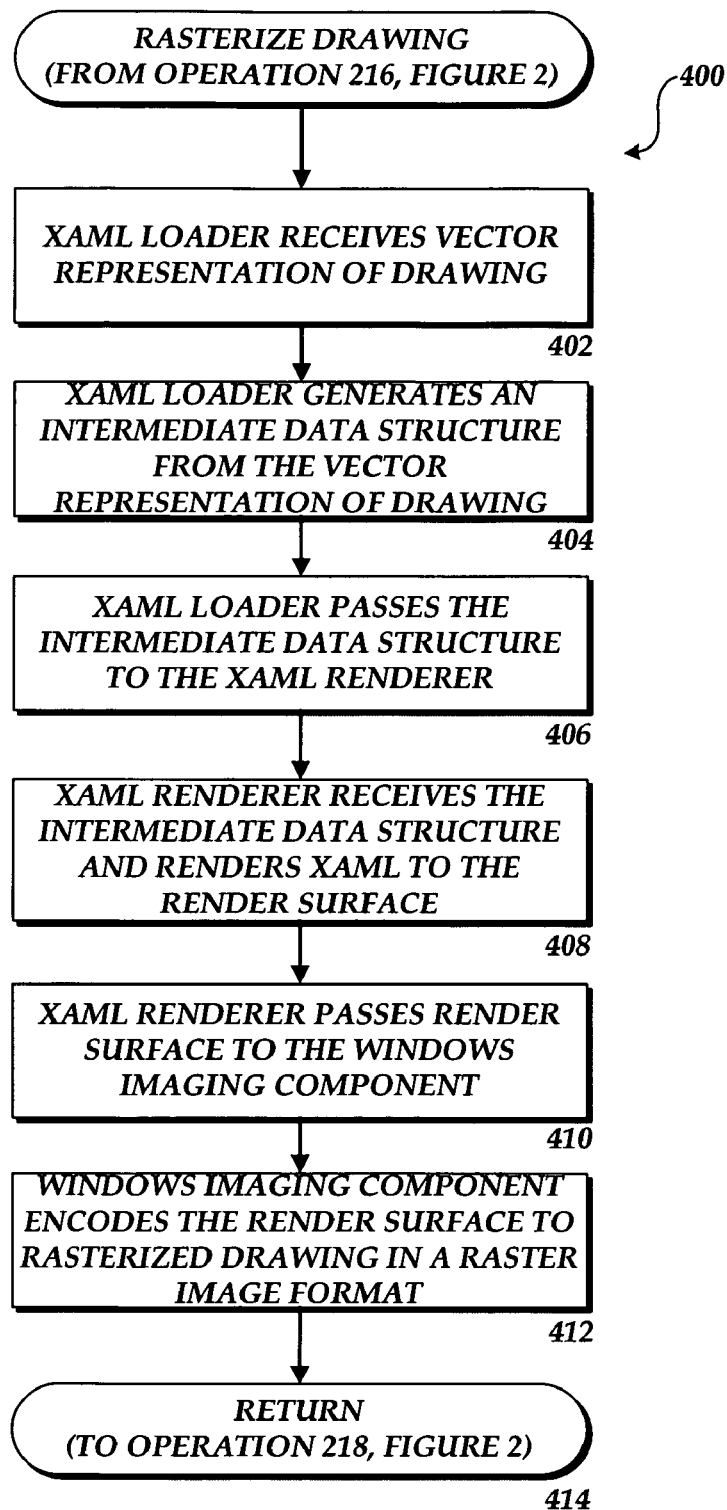
FIG. 4 is a flow diagram showing a routine that illustrates aspects of the operation of the rasterizer provided in embodiments herein.

Turning now to FIG. 4, a routine 400 will be described that illustrates the operation of the rasterizer 134 in one embodiment presented herein. The routine 400 begins at operation 402, where the XAML loader 302 receives a vector graphic, such as the vector representation 120 of the drawing 108. From operation 402, the routine 400 continues to operation 404, where the XAML loader 302 generates the intermediate data structure 310 in the manner described above. Once the intermediate data structure 310 has been generated, the routine 400 continues to operation 406, where the XAML loader 302 passes the intermediate data structure 310 to the XAML renderer 304. The routine 400 then continues to operation 408.

At operation 408, the XAML renderer 304 receives the intermediate data structure 310 and renders the intermediate data structure 310 to the render surface 306. Once the intermediate data structure 310 has been rendered to the render surface 306, the routine 400 continues to operation 410, where the XAML renderer 304 passes the render surface 306 to the WINDOWS IMAGING COMPONENT 308, described above. The WINDOWS IMAGING COMPONENT 308 then encodes the render surface 306 to a raster image, such as the rasterized drawing 136, in a standard image format such as JPEG or PNG, as described above. Once the WINDOWS IMAGING COMPONENT completes its operation, the routine 400 continues from operation 412 to operation 414, where it ends.

Figure 5:
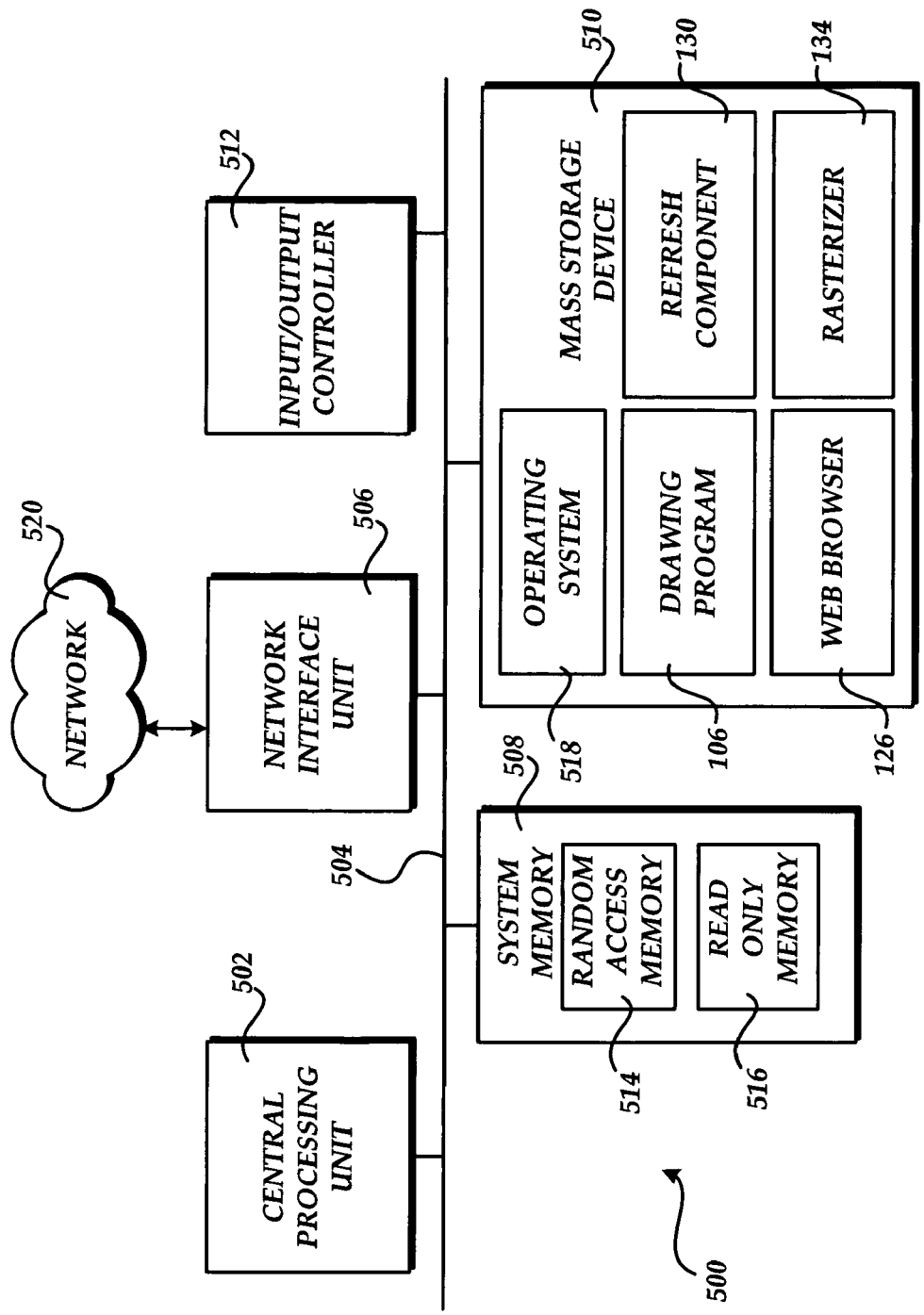
FIG. 5 is a computer architecture diagram showing an illustrative computer hardware and software architecture for a computing system capable of implementing aspects of the embodiments presented herein.

FIG. 5 shows an illustrative computer architecture for a computer 500 capable of executing the software components described herein for rasterizing vector graphics on a server computer 104 in the manner presented above. The computer architecture shown in FIG. 5 illustrates a conventional desktop, laptop, or server computer and may be utilized to execute the software components presented herein described as executing on the client computer 102 or the server computer 104.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, where the computer architecture shown in FIG. 5 is utilized to embody the client computer 102, the mass storage device 510 and the RAM 514 may store the drawing program 106 and the Web browser 126. Where the computer architecture shown in FIG. 5 is utilized to embody the server computer 104, the mass storage device 510 may store the refresh component 130 and the recalculation engine 132. The mass storage device 510 and the RAM 514 may also store other types of program modules not shown in FIG. 5.

Based on the foregoing, it should be appreciated that technologies for rasterizing vector graphics on a server computer are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for rasterizing a vector graphic formatted using an extensible application markup language (XAML), the method comprising:

generating an intermediate data structure comprising a visual tree from the vector graphic by executing a XAML loader configured to generate the intermediate data structure from the vector graphic, the XAML loader configured for multi-threaded and multi-processor execution on a server computer;

rendering the intermediate data structure to a render surface comprising an uncompressed unencoded bitmap image by executing a XAML renderer configured to render the intermediate data structure to a render surface, the XAML renderer configured for multi-threaded and multi-processor execution on a server computer; and encoding the render surface to a raster image in a standard image format.

2. The method of claim 1, wherein the vector graphic comprises a vector representation of a drawing and wherein the raster image comprises a rasterized drawing.

3. A system for rasterizing a vector graphic comprising a vector representation of a drawing formatted using an extensible application markup language (XAML), the system comprising a server computer configured to execute:

a XAML loader configured to receive the vector graphic and to generate an intermediate data structure from the vector graphic, the XAML loader configured for multi-threaded and multi-processor execution on the server computer;

a XAML renderer configured to receive the intermediate data structure and to render the intermediate data structure to a render surface, the XAML renderer configured for multi-threaded and multi-processor execution on the server computer; and an imaging component configured to receive the render surface and to encode the render surface to a raster image comprising a rasterized drawing.

4. The system of claim 3, wherein the intermediate data structure comprises a visual tree and wherein the render surface comprises an uncompressed unencoded bitmap image.

5. The system of claim 4, wherein encoding the render surface to a raster image comprises encoding the render surface to a raster image in a standard image format.

6. A method for server-based rasterization of a vector representation of a drawing formatted using an extensible application markup language (XAML), the method comprising:

storing a published drawing at a server computer, the published drawing comprising a vector representation of the drawing;

receiving at the server computer a request to view the published drawing; and in response to the request, updating the vector representation of the drawing, rasterizing the vector representation of the drawing by executing a XAML loader configured to generate a visual tree from the vector representation of the drawing, the XAML, loader configured for multi-threaded and multi-processor execution on the server computer, executing a XAML renderer configured to render the visual tree to a render surface comprising an uncompressed unencoded bitmap image, the XAML renderer configured for multi-threaded and multi-processor execution on the server computer, and encoding the render surface to a rasterized drawing in a standard image format, and returning the rasterized drawing in response to the request to view the published drawing.

* * * * *